United States Patent
Xu et al.

(10) Patent No.: US 10,286,389 B2
(45) Date of Patent: May 14, 2019

(54) CARRIER AND CATALYST FOR SELECTIVELY SYNTHESIZING KEROSENE FRACTION FROM SYNGAS, AND METHOD FOR PREPARING THE SAME

(71) Applicant: WUHAN KAIDI ENGINEERING TECHNOLOGY RESEARCH INSTITUTE CO., LTD., Wuhan (CN)

(72) Inventors: Li Xu, Wuhan (CN); Wanwan Wang, Wuhan (CN); Youliang Shi, Wuhan (CN)

(73) Assignee: WUHAN KAIDI ENGINEERING TECHNOLOGY RESEARCH INSTITUTE CO., LTD., Wuhan (CN)

(*) Notice: Subject to any disclaimer, the term of this patent is extended or adjusted under 35 U.S.C. 154(b) by 0 days.

(21) Appl. No.: 15/839,835

(22) Filed: Dec. 12, 2017

(65) Prior Publication Data
US 2018/0111117 A1    Apr. 26, 2018

Related U.S. Application Data

(63) Continuation-in-part of application No. PCT/CN2016/079384, filed on Apr. 15, 2016.

(30) Foreign Application Priority Data

Jun. 16, 2015 (CN) .......................... 2015 1 0334826

(51) Int. Cl.
| | | |
|---|---|---|
| *C10G 2/00* | (2006.01) | |
| *B01J 21/00* | (2006.01) | |
| *B01J 21/04* | (2006.01) | |
| *B01J 21/06* | (2006.01) | |
| *B01J 29/04* | (2006.01) | |
| *B01J 29/85* | (2006.01) | |
| *B01J 32/00* | (2006.01) | |
| *B01J 35/02* | (2006.01) | |
| *B01J 35/10* | (2006.01) | |
| *C01B 39/02* | (2006.01) | |
| *C01B 39/54* | (2006.01) | |
| *C10G 47/20* | (2006.01) | |
| *B01J 27/185* | (2006.01) | |

(52) U.S. Cl.
CPC ............... *B01J 29/85* (2013.01); *B01J 21/00* (2013.01); *B01J 21/04* (2013.01); *B01J 21/066* (2013.01); *B01J 27/1853* (2013.01); *B01J 29/041* (2013.01); *B01J 32/00* (2013.01); *B01J 35/026* (2013.01); *B01J 35/10* (2013.01); *C01B 39/02* (2013.01); *C01B 39/54* (2013.01); *C10G 2/00* (2013.01); *C10G 47/20* (2013.01); *B01J 2229/62* (2013.01); *C10G 2400/04* (2013.01)

(58) Field of Classification Search
CPC ...... B01J 29/7884; B01J 29/076; B01J 29/48; B01J 35/026; B01J 35/1019; B01J 35/1038; B01J 35/1042; B01J 35/1061; B01J 37/009; B01J 37/02; B01J 37/0201; B01J 37/04; B01J 37/06; B01J 37/08; B01J 37/343; C10G 49/04; C10G 49/08
See application file for complete search history.

(56) References Cited

FOREIGN PATENT DOCUMENTS

CN         101327441 A    * 12/2008

* cited by examiner

*Primary Examiner* — Melvin C. Mayes
*Assistant Examiner* — Michael Forrest
(74) *Attorney, Agent, or Firm* — Matthias Scholl P.C.; Matthias Scholl

(57) ABSTRACT

A carrier for selectively synthesizing kerosene fraction from syngas, the carrier including the following components in parts by weight: 5-50 parts of mesoporous zirconia ($ZrO_2$), 10-55 parts of a silicoaluminophosphate (SAPO) molecular sieve, 5-50 parts of modified mesoporous molecular sieve Al-SBA-16, 1-3 parts of sesbania gum powder, and 10-70 parts of alumina A catalyst includes a soluble cobalt salt and the aforesaid carrier. The soluble cobalt salt is loaded on the surface of the carrier.

20 Claims, No Drawings

CARRIER AND CATALYST FOR SELECTIVELY SYNTHESIZING KEROSENE FRACTION FROM SYNGAS, AND METHOD FOR PREPARING THE SAME

CROSS-REFERENCE TO RELATED APPLICATIONS

This application is a continuation-in-part of International Patent Application No. PCT/CN2016/079384 with an international filing date of Apr. 15, 2016, designating the United States, now pending, and further claims foreign priority to Chinese Patent Application No. 201510334826.6 filed Jun. 16, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The present disclosure relates to a carrier and catalyst for selectively synthesizing kerosene fraction from syngas, and a method for preparing the same.

Description of the Related Art

Typically, the gasoline fraction resulting from Fischer-Tropsch synthesis has a low octane number, and the freezing points of the kerosene and diesel fractions are relatively high, which limits their use as fuel oil. Therefore, the Fischer-Tropsch synthesis is usually combined with the hydrocracking process at present. By selectively breaking chains and isomerizing the linear alkanes produced through Fischer-Tropsch synthesis, the content of iso-alkanes in the product is increased, and the low-temperature flowability of the oil is improved. However, under normal circumstances, the investment and operation costs of a hydrogenation unit are very high. These factors limit the optimization and quality improvement with respect to the products of Fischer-Tropsch synthesis.

Conventional catalysts for highly selectively preparing gasoline or diesel from syngas through Fischer-Tropsch synthesis employ molecular sieves such as ZSM, Y, β, MOR or activated carbon and carbon nanotubes as carriers. On the one hand, these carriers contain strongly acidic sites, causing excessive secondary cleavage of the long-chain hydrocarbons and producing more methane. On the other hand, these carriers have a very weak isomerization performance, causing a low iso-alkane content in the product. Although a catalyst supported on carbon material as a carrier greatly attenuates the interaction between the active component and the carrier and improves the activity of the catalyst, the proportion of iso-alkanes in the fraction oil is very limited because the carrier has nearly no isomerization performance.

SUMMARY OF THE INVENTION

It is one objective of the present disclosure to provide a carrier and a catalyst for selectively synthesizing a kerosene fraction from syngas, and a method for preparing the same. The catalyst prepared by using the carrier has the characteristics of low selectivity for methane, high selectivity for middle fraction and good isomerization performance High-quality kerosene fraction can be directly and selectively obtained through Fischer-Tropsch synthesis reaction in the presence of the catalyst.

To achieve the above objective, in accordance with one embodiment of the present disclosure, there is provided a carrier for selectively synthesizing a kerosene fraction from syngas. The carrier comprises the following components in parts by weight: 5-50 parts of mesoporous zirconia ($ZrO_2$), 10-55 parts of a silicoaluminophosphate molecular sieve, 5-50 parts of modified mesoporous molecular sieve Al-SBA-16, 1-3 parts of sesbania gum powder, and 10-70 parts of alumina.

In a class of this embodiment, the carrier comprises the following components in parts by weight: 10-30 parts of the mesoporous zirconia, 25-45 parts of the silicoaluminophosphate molecular sieve, 10-30 parts of the modified Al-SBA-16, 1-3 parts of the sesbania gum powder, and 30-55 parts of the alumina.

In a class of this embodiment, the carrier comprises the following components in parts by weight: 20 parts of the mesoporous zirconia, 30 parts of the silicoaluminophosphate molecular sieve, 25 parts of the modified Al-SBA-16, 1 part of the sesbania gum powder, and 30 parts of the alumina.

In a class of this embodiment, the raw material of the modified Al-SBA-16 comprises SBA-16 and aluminum triethoxide ($Al(OC_2H_7)_3$), in which the weight ratio of SBA-16 to aluminum triethoxide is 1:3.0-4.5.

In a class of this embodiment, a molar ratio n of silicon to aluminum in the modified Al-SBA-16 is between 5 and 55, a Brönsted acid (B acid) content thereof is 39-92 $\mu mol \cdot g^{-1}$, a Lewis acid (L acid) content thereof is 71-105 $\mu mol \cdot g^{-1}$, and a $Na_2O$ content thereof is ≤0.1 wt. %.

In a class of this embodiment, the modified Al-SBA-16 has a molar ratio n of silicon to aluminum of 10-25, a specific surface area of 550-930 $m^2 \cdot g^{-1}$, an average pore size of 4.0-7.5 nm, and a total pore volume of 0.45-0.70 $cm^3 \cdot g^{-1}$.

In a class of this embodiment, the modified Al-SBA-16 is prepared as follows:

1) weighing SBA-16 and aluminum triethoxide according to the aforesaid weight ratio, and dividing the aluminum triethoxide into two equal portions for use;
2) adding SBA-16 to n-hexane, and uniformly stiffing at room temperature, to obtain a mixed solution; adding one portion of the aluminum triethoxide to n-hexane, and stiffing at room temperature until the aluminum triethoxide is dissolved; and adding the aluminum triethoxide dissolved in the n-hexane to the mixed solution, and stiffing overnight at room temperature, to obtain a sample solution;
3) transferring the sample solution obtained in 2) to a Buchner funnel, washing with n-hexane, and suctioning; and repeating aforesaid operations 2 to 4 times, to obtain a primary filter cake;
4) adding the primary filter cake to n-hexane, and uniformly stiffing at room temperature; adding another portion of the aluminum triethoxide; stiffing overnight at room temperature, transferring to a Buchner funnel, washing with n-hexane, and suctioning; and repeating aforesaid operations 2 to 4 times, to obtain a secondary filter cake; and
5) baking the secondary filter cake at 500-650° C. for 6-10 h, to obtain modified Al-SBA-16.

In a class of this embodiment, the mesoporous zirconia has a specific surface area of 190-350 $m^2 \cdot g^{-1}$, an average pore size of 5.0-8.5 nm, and a total pore volume of 0.40-0.55 $cm^3 \cdot g^{-1}$.

In a class of this embodiment, the silicoaluminophosphate molecular sieve has a total acid content of 0.1-0.35 mmol $NH_3 \cdot g^1$; a molar ratio of silicon to aluminum of 0-1.0; a specific surface area of $\geq 150$ $m^2 \cdot g^{-1}$, a $Na_2O$ content of $\leq 0.2$ wt. %, and a total pore volume of 0.10-0.30 $cm^3 \cdot g^{-1}$.

In a class of this embodiment, the silicoaluminophosphate molecular sieve has a molar ratio of silicon to aluminum of 0.21-0.38, a specific surface area of $\geq 180$ $m^2 \cdot g^{-1}$, a $Na_2O$ content of $\leq 0.2$ wt. %, and a total pore volume of 0.10-0.30 $cm^3 \cdot g^{-1}$. Alternatively, the silicoaluminophosphate molecular sieve has a molar ratio of silicon to aluminum of 0-1.0, a specific surface area of $\geq 150$ $m^2 \cdot g^{-1}$, a $Na_2O$ content of $\leq 0.2$ wt. %, and a total pore volume of 0.13-0.26 $cm^3 \cdot g^{-1}$.

The present disclosure further provides a method for preparing a carrier for use in selective synthesis of a kerosene fraction from syngas, the method comprising:
1) weighing SBA-16 and aluminum triethoxide according to a weight ratio 1:3.0-4.5, and dividing the aluminum triethoxide into two equal portions;
2) adding the SBA-16 to n-hexane, and uniformly stirring at room temperature, to obtain a mixed solution; adding one portion of the aluminum triethoxide to n-hexane, and stirring at room temperature until the aluminum triethoxide is dissolved; and adding the aluminum triethoxide dissolved in n-hexane to the mixed solution, and stirring overnight at room temperature, to obtain a sample solution;
3) transferring the sample solution obtained in 2) to a Buchner funnel, washing with n-hexane, and suctioning; and repeating aforesaid operations 2 to 4 times, to obtain a primary filter cake;
4) adding the filter cake to n-hexane, and uniformly stiffing at room temperature; adding another portion of the aluminum triethoxide; stiffing overnight at room temperature, transferring to a Buchner funnel, washing with n-hexane, and suctioning; and repeating aforesaid operations 2 to 4 times, to obtain a secondary filter cake;
5) baking the secondary filter cake at 500-650° C. for 6-10 h, to obtain modified Al-SBA-16 for use;
6) uniformly kneading microporous alumina with a dilute nitric acid solution at a weight ratio thereof of 1:0.5-1.5, to prepare a viscous paste for use, in which a concentration of the dilute nitric acid solution is 5-20 wt. %; and
7) weighing, in parts by weight, 5-50 parts of mesoporous zirconia, 10-55 parts of the silicoaluminophosphate molecular sieve, 5-50 parts of modified Al-SBA-16, 1-3 parts of sesbania gum powder and 10-70 parts of the viscous paste based on alumina; and uniformly mixing aforesaid components, rolling, extrusion molding, drying for 6-12 h at 90-120° C., then baking for 4-10 h in air at 500-600° C., and cooling to room temperature to obtain the carrier.

In a class of this embodiment, the carrier is in the shape of a cylindrical strip, a clover or a four-leaf clover. The carrier in the shape of a cylindrical strip has a particle size of 1.2-1.6 mm, and a length of 5-10 mm; and the carrier in the shape of a clover or a four-leaf clover has a distance between two leaves of 1.1-1.8 mm, and a length of 5-10 mm.

The present disclosure further provides a catalyst for selectively synthesizing a kerosene fraction from syngas, which comprises a soluble cobalt salt and a carrier, where the soluble cobalt salt is loaded on the surface of the carrier.

In a class of this embodiment, the soluble cobalt salt accounts for 5-20 wt. % of the catalyst.

In a class of this embodiment, the soluble cobalt salt is cobalt nitrate, cobalt acetate or carbonyl cobalt.

The present disclosure also provides a method for preparing a catalyst, which comprises impregnating the carrier with an aqueous solution containing the soluble cobalt salt by iso-volume impregnation, aging overnight at room temperature, then drying for 4-12 h at 90-120° C. under normal pressure, baking for 4-10 h in air at 500-600° C. and cooling to room temperature to obtain the catalyst.

The performance of the catalyst according to the present disclosure is evaluated in a fixed bed reactor, and the operations are as follows. The catalyst is reduced in high-purity hydrogen. The reduction conditions comprise a catalyst bed temperature of 300-500° C., a reduction pressure of 0.1-1.3 mPa, a space velocity of hydrogen of 500-1200 $h^{-1}$, and a reduction time of 4-24 h. The reaction conditions comprise a volume ratio of syngas to nitrogen of 1.0, a $H_2/CO$ molar ratio in syngas of 1.2-2.1, a space velocity of syngas of 500-2000 $h^{-1}$, a catalyst bed temperature of 180-215° C., and a reaction pressure of 1.0-3.5 mPa.

Advantages of the carrier and catalyst according to embodiments of the present disclosure are summarized as follows:
1. The catalyst carrier provided in the present disclosure has a moderate acidity and a three-dimensional pore channel structure, in which the mesoporous pore channel is large and uniform, and the mass transferring and diffusion effect is good, whereby the production of methane during the reaction process can be reduced effectively while the selectivity to kerosene fraction is increased.
2. The catalyst carrier provided in the present disclosure has a high isomerization performance, by which the low-temperature flowability of kerosene fraction can be significantly increased through the isomerization of long-chain linear alkanes to increase the proportion of isoalkanes in the product.
3. Compared with other acidic carriers, the catalyst carrier provided in the present disclosure has a moderate interaction with the active component; and the active component is highly reductive, such that the catalyst is maintained to have a high reactivity while a high-quality kerosene fraction is obtained.

DETAILED DESCRIPTION OF THE EMBODIMENTS

For a better explanation of the present disclosure, the main disclosure of the present disclosure is further described below with reference to specific embodiments. However, the present disclosure is not limited to the following embodiments.

Preparation of Raw Materials Necessitated in the Carrier of the Present Disclosure I. Preparation of Modified Al-SBA-16

1. Preparation of Modified Al-SBA-16 (5)

1). 30 g of SBA-16 was weighed, added to 100 mL of n-hexane, and stirred for 2 h at room temperature.

2). 45 g of $Al(OC_2H_7)_3$ was weighed, added to 100 mL of n-hexane, and stirred at room temperature until it was dissolved. Then the solution of Al $(OC_2H_7)_3$ in n-hexane was added to a beaker containing SBA-16, and stirred overnight at room temperature.

3). The resulting sample was transferred to a Buchner funnel, washed with 50 mL of n-hexane, and suctioned. The process was repeated 3 times, to obtain a primary filter cake.

4). The primary filter cake was transferred to a beaker, and then 100 mL of n-hexane was added and stirred for 1 h at room temperature. Then, 45 g of Al (OC$_2$H$_7$)$_3$ was added and stirred overnight at room temperature. The filter cake was transferred to a Buchner funnel, washed with 50 mL of n-hexane, and suctioned. The process was repeated 3 times. Finally, the resulting secondary filter cake was baked for 10 h at 550° C., to obtain modified Al-SBA-16 (5) for use.

2. Preparation of Modified Al-SBA-16 (10)

1). 30 g of SBA-16 was weighed, added to 100 mL of n-hexane, and stirred for 3 h at room temperature.

2). 41 g of Al(OC$_2$H$_7$)$_3$ was weighed, added to 100 mL of n-hexane, and stirred at room temperature until it was dissolved. Then the solution of Al (OC$_2$H$_7$)$_3$ in n-hexane was added to a beaker containing SBA-16, and stirred overnight at room temperature.

3). The resulting sample was transferred to a Buchner funnel, washed with 50 mL of n-hexane, and suctioned. The process was repeated 3 times, to obtain a primary filter cake.

4). The primary filter cake was transferred to a beaker, and then 100 mL of n-hexane was added and stirred for 1.5 h at room temperature. Then, 41 g of Al (OC$_2$H$_7$)$_3$ was added and stirred overnight at room temperature. The filter cake was transferred to a Buchner funnel, washed with 50 mL of n-hexane, and suctioned. The process was repeated 3 times. Finally, the resulting secondary filter cake was baked for 8 h at 550° C., to obtain modified Al-SBA-16 (10) for use.

3. Preparation of Modified Al-SBA-16 (20)

1). 30 g of SBA-16 was weighed, added to 100 mL of n-hexane, and stirred for 4 h at room temperature.

2). 37 g of Al(OC$_2$H$_7$)$_3$ was weighed, added to 100 mL of n-hexane, and stirred at room temperature until it was dissolved. Then the solution of Al (OC$_2$H$_7$)$_3$ in n-hexane was added to a beaker containing SBA-16, and stirred overnight at room temperature.

3). The resulting sample was transferred to a Buchner funnel, washed with 50 mL of n-hexane, and suctioned. The process was repeated 3 times, to obtain a primary filter cake.

4). The primary filter cake was transferred to a beaker, and then 100 mL of n-hexane was added and stirred for 2 h at room temperature. Then, 37 g of Al (OC$_2$H$_7$)$_3$ was added and stirred overnight at room temperature. The filter cake was transferred to a Buchner funnel, washed with 50 mL of n-hexane, and suctioned. The process was repeated 3 times. Finally, the resulting secondary filter cake was baked for 6 h at 580° C., to obtain modified Al-SBA-16 (20) for use.

4. Preparation of Modified Al-SBA-16 (25)

1). 30 g of SBA-16 was weighed, added to 100 mL of n-hexane, and stirred for 4 h at room temperature.

2). 35 g of Al(OC$_2$H$_7$)$_3$ was weighed, added to 100 mL of n-hexane, and stirred at room temperature until it was dissolved. Then the solution of Al (OC$_2$H$_7$)$_3$ in n-hexane was added to a beaker containing SBA-16, and stirred overnight at room temperature.

3). The resulting sample was transferred to a Buchner funnel, washed with 50 mL of n-hexane, and suctioned. The process was repeated 3 times, to obtain a primary filter cake.

4). The primary filter cake was transferred to a beaker, and then 100 mL of n-hexane was added and stirred for 2 h at room temperature. Then, 35 g of Al (OC$_2$H$_7$)$_3$ was added and stirred overnight at room temperature. The filter cake was transferred to a Buchner funnel, washed with 50 mL of n-hexane, and suctioned. The process was repeated 3 times. Finally, the resulting secondary filter cake was baked for 6 h at 580° C., to obtain modified Al-SBA-16 (25) for use.

5. Preparation of Modified Al-SBA-16 (40)

1). 30 g of SBA-16 was weighed, added to 100 mL of n-hexane, and stirred for 4.5 h at room temperature.

2). 33 g of Al(OC$_2$H$_7$)$_3$ was weighed, added to 100 mL of n-hexane, and stirred at room temperature until it was dissolved. Then the solution of Al (OC$_2$H$_7$)$_3$ in n-hexane was added to a beaker containing SBA-16, and stirred overnight at room temperature.

3). The resulting sample was transferred to a Buchner funnel, washed with 50 mL of n-hexane, and suctioned. The process was repeated 3 times, to obtain a primary filter cake.

4). The primary filter cake was transferred to a beaker, and then 100 mL of n-hexane was added and stirred for 2.5 h at room temperature. Then, 33 g of Al (OC$_2$H$_7$)$_3$ was added and stirred overnight at room temperature. The filter cake was transferred to a Buchner funnel, washed with 50 mL of n-hexane, and suctioned. The process was repeated 3 times. Finally, the resulting secondary filter cake was baked for 6 h at 600° C., to obtain modified Al-SBA-16 (40) for use.

6. Preparation of Modified Al-SBA-16 (55)

1). 30 g of SBA-16 was weighed, added to 100 mL of n-hexane, and stirred for 5 h at room temperature.

2). 30 g of Al(OC$_2$H$_7$)$_3$ was weighed, added to 100 mL of n-hexane, and stirred at room temperature until it was dissolved. Then the solution of Al (OC$_2$H$_7$)$_3$ in n-hexane was added to a beaker containing SBA-16, and stirred overnight at room temperature.

3). The resulting sample was transferred to a Buchner funnel, washed with 50 mL of n-hexane, and suctioned. The process was repeated 3 times. Then the filter cake was transferred to a beaker, washed with 100 mL of n-hexane, and stirred for 3 h at room temperature. Thereafter, 30 g of Al(OC$_2$H$_7$)$_3$ was added, stirred overnight at room temperature to obtain a primary filter cake.

4). The primary filter cake was transferred to a Buchner funnel, washed with 50 mL of n-hexane, and suctioned. The process was repeated 3 times. Finally, the resulting secondary filter cake was baked for 6 h at 650° C., to obtain modified Al-SBA-16 (55) for use.

II. Preparation of a Viscous Paste of Alumina

Microporous alumina was kneaded with a dilute nitric acid solution at a weight ratio of 1:0.5-1.5, in which the concentration of the dilute nitric acid solution was 5-20 wt. %.

In an industrialized operation, a preferred solution that follows is adopted.

500 g of dry microporous alumina powder was weighed and added to a feed tank of a kneader. 750 mL of 8 wt. % dilute nitric acid was slowly added to the feed tank. The kneader was started, and the materials were kneaded uniformly, to form a viscous paste for use.

III. Selection of Silicoaluminophosphate Molecular Sieve

The silicoaluminophosphate molecular sieve is commercially available, and the SPAO-11 molecular sieve, the SPAO-31 molecular sieve, or a mixture of the SPAO-11 and SPAO-31 molecular sieve is used. The SPAO-11 has a molar ratio of silicon to aluminum of 0.21-0.38, a specific surface area of ≥180 m$^2$·g$^{-1}$, a Na$_2$O content of ≤0.2 wt. %, and a total pore volume of 0.10-0.30 cm$^3$·g$^{-1}$; and the SPAO-31 has a molar ratio of silicon to aluminum of 0-1.0, a specific surface area of ≥150 m$^2$·g$^{-1}$, a Na$_2$O content of ≤0.2 wt. %, and a total pore volume of 0.13-0.26 cm$^3$·g$^{-1}$.

Other raw materials used in the present disclosure are all commercially available.

A carrier for selectively synthesizing a high-quality kerosene fraction from syngas was prepared with the above raw materials through a method as follows.

5-50% by weight (wt. %) of mesoporous zirconia, 10-55 wt. % of the silicoaluminophosphate molecular sieve, 5-50 wt. % of modified Al-SBA-16, 1-3 wt. % of sesbania gum powder and 10-70 wt. % of a binder were uniformly mixed, rolled, extrusion molded, dried for 6-12 h at 90-120° C., and then baked for 4-10 h in air at 500-600° C., and cooled to room temperature to obtain a carrier.

In connection with the above method, the formulation in industrial production is shown in Table 1 below.

TABLE 1

| Raw material | | 1 | 2 | 3 | 4 | 5 | 6 | 7 | 8 | 9 | 10 | 11 | 12 |
|---|---|---|---|---|---|---|---|---|---|---|---|---|---|
| Mesoporous zirconia | | 15 | 15 | 10 | 10 | 30 | 30 | 20 | 20 | 5 | 50 | 15 | 5 |
| Silicoaluminophosphate Molecular sieve | SPAO-11 | 25 | 25 | 45 | 45 | 10 | 10 | 30 | 30 | | 15 | | 10 |
| | SPAO-31 | | | | | | | | | 55 | 10 | 10 | |
| Modified Al-SBA-16 (n) | 5 (n) | | 10 | | | | | | | | | | |
| | 10 (n) | | | | 5 | | | | | | 15 | | |
| | 20 (n) | | | 10 | | 5 | 30 | | | | | | 55 |
| | 25 (n) | | | | | | | 20 | | | | | |
| | 30 (n) | | | | | | | | | | 20 | | |
| | 40 (n) | | | | | | | | 30 | | | | |
| | 55 (n) | | | | | | | | | 20 | | 5 | |
| *Sesbania* gum powder | | 1 | 1 | 1 | 1 | 1 | 1 | 1 | 1 | 2 | 3 | 1 | 2 |
| Viscous paste (alumina) | | 167 (50) | 167 (50) | 133 (40) | 133 (40) | 100 (30) | 100 (30) | 100 (30) | 100 (30) | 67 (20) | 34 (10) | 233 (70) | 100 (30) |

Optimized reaction conditions are shown in Table 2.

TABLE 2

| Example | Drying temperature (° C.) | Drying time (h) | Baking temperature (° C.) | Baking time (h) |
|---|---|---|---|---|
| 1 | 90 | 12 | 500 | 10 |
| 2 | 110 | 10 | 550 | 8 |
| 3 | 90 | 12 | 500 | 8 |
| 4 | 110 | 10 | 550 | 8 |
| 5 | 90 | 12 | 600 | 6 |
| 6 | 110 | 8 | 550 | 8 |
| 7 | 110 | 8 | 550 | 8 |
| 8 | 110 | 8 | 500 | 10 |
| 9 | 120 | 6 | 600 | 4 |
| 10 | 100 | 8 | 580 | 6 |
| 11 | 110 | 10 | 550 | 8 |
| 12 | 90 | 12 | 600 | 10 |

The carrier obtained in above examples was used in the preparation of a catalyst through a method comprising the following.

Iso-volume impregnation was employed. First, the carrier was transferred to a pear-shaped flask, and placed in a rotary evaporator, to keep the carrier in a constantly turning state. The carrier is impregnated with an aqueous solution containing a soluble cobalt salt. The pear-shaped flask was maintained to rotate for 20-40 min, and then aged overnight at room temperature. Subsequently, the product was dried for 4-12 h at 90-120° C. under normal pressure, and finally baked for 4-10 h in air at 500-600° C. and cooled to room temperature to obtain a catalyst.

In actual operation, the carrier may be impregnated with the soluble cobalt salt in two times to improve the load efficiency of the carrier.

In connection with the above method, the amount of the soluble cobalt salt used in the catalyst formulation in industrial production is shown in Table 3 below.

TABLE 3

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Soluble cobalt salt | Cobalt nitrate | 12 | 36 | 24 | 45.6 | 19.2 | 36 | 36 | 48 | | | | |
| | Cobalt acetate | | | | | | | | | 42 | | 36 | |
| | Carbonyl cobalt | | | | | | | | | | 20 | | 12 |

40 g of the carrier prepared in above examples was weighed, and impregnated with the soluble cobalt salt through the above method. Specifically, the optimized reaction conditions are shown in Table 4 below.

TABLE 4

| Example | Drying temperature (° C.) | Drying time (h) | Baking temperature (° C.) | Baking time (h) |
|---|---|---|---|---|
| 1 | 90 | 10 | 550 | 8 |
| 2 | 90 | 10 | 550 | 8 |
| 3 | 90 | 10 | 550 | 8 |
| 4 | 90 | 10 | 550 | 8 |
| 5 | 90 | 10 | 550 | 8 |
| 6 | 90 | 10 | 550 | 8 |
| 7 | 90 | 10 | 550 | 8 |
| 8 | 110 | 8 | 500 | 10 |
| 9 | 120 | 4 | 600 | 4 |
| 10 | 90 | 12 | 500 | 10 |
| 11 | 100 | 6 | 600 | 8 |
| 12 | 110 | 10 | 550 | 4 |

The performance of the catalyst was evaluated in a fixed bed reactor. The catalyst was activated under conditions including a temperature of 350° C., a pressure of hydrogen of 0.1 mPa, a space velocity of hydrogen of 500 h$^{-1}$, and a reduction time of 24 h. The performance of the catalyst was evaluated under conditions including a H$_2$/CO molar ratio of 2.1, a space velocity of syngas of 2000 h$^{-1}$, a space velocity of 205° C., and a reaction pressure of 3.5 mPa. The performance evaluation result of the catalyst is summarized in Table 5.

TABLE 5

| Indicator | Catalyst | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| CO conversation rate (%) | 48.1 | 56.4 | 52.3 | 59.0 | 50.1 | 56.5 | 59.9 | 60.7 | 53.1 | 49.2 | 50.5 | 46.2 |
| Selectivity for $CH_4$ (wt. %) | 2.3 | 2.6 | 3.0 | 3.1 | 3.8 | 4.2 | 4.9 | 5.1 | 3.7 | 2.9 | 4.0 | 3.6 |
| Selectivity for fraction distilled at 155-265° C. (wt. %) | 73.1 | 83.5 | 66.3 | 64.4 | 78.0 | 77.5 | 85.8 | 81.1 | 79.0 | 67.2 | 75.3 | 68.9 |
| Content of iso-products in fraction distilled at 155-265° C. (wt. %) | 78.2 | 83.9 | 80.2 | 79.8 | 76.0 | 75.1 | 84.3 | 84.2 | 77.2 | 80.5 | 81.4 | 78.8 |
| Freezing point of fraction distilled at 155-265° C. (° C.) | −42 | −49 | −44 | −43 | −39 | −38 | −52 | −51 | −42 | −43 | −38 | −41 |

As shown in Table 5, in the composition of the catalyst carrier prepared in Example 7, the mesoporous zirconia, silicoaluminophosphate molecular sieve, modified SBA-16, and alumina are combined at a most preferable ratio, and when the salt of the metal cobalt is loaded in a suitable amount, the performance of the catalyst is most desirable. At a high conversion rate, the selectivity for a kerosene fraction distilled at 155-265° C. can reach 85.8%, the content of iso-products reaches 84.3% and the kerosene fraction has a freezing point of −52° C.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A carrier, comprising the following components in parts by weight: 5-50 parts of mesoporous zirconia ($ZrO_2$), 10-55 parts of a silicoaluminophosphate (SAPO) molecular sieve, 5-50 parts of modified mesoporous molecular sieve Al-SBA-16, 1-3 parts of sesbania gum powder, and 10-70 parts of alumina.

2. The carrier of claim 1, comprising the following components in parts by weight: 10-30 parts of the mesoporous zirconia, 25-45 parts of the silicoaluminophosphate molecular sieve, 10-30 parts of the modified Al-SBA-16, 1-3 parts of the sesbania gum powder, and 30-55 parts of the alumina.

3. The carrier of claim 2, comprising the following components in parts by weight: 20 parts of the mesoporous zirconia, 30 parts of the silicoaluminophosphate molecular sieve, 25 parts of the modified Al-SBA-16, 1 part of the sesbania gum powder, and 30 parts of the alumina.

4. The carrier of claim 1, wherein the modified Al-SBA-16 comprises SBA-16 and aluminum triethoxide (Al($OC_2H_7$)$_3$), in which a weight ratio of SBA-16 to aluminum triethoxide is 1:3.0-4.5.

5. The carrier of claim 3, wherein the modified Al-SBA-16 comprises SBA-16 and aluminum triethoxide (Al($OC_2H_7$)$_3$), in which a weight ratio of SBA-16 to aluminum triethoxide is 1:3.0-4.5.

6. The carrier of claim 1, wherein a molar ratio n of silicon to aluminum in the modified Al-SBA-16 is between 5 and 55, a Brönsted acid (B acid) content thereof is 39-92 µmol·$g^{-1}$, a Lewis acid (L acid) content thereof is 71-105 µmol·$g^{-1}$, and a $Na_2O$ content thereof is ≤0.1 wt. %.

7. The carrier of claim 3, wherein a molar ratio n of silicon to aluminum in the modified Al-SBA-16 is between 5 and 55, a Brönsted acid (B acid) content thereof is 39-92 µmol·$g^{-1}$, a Lewis acid (L acid) content thereof is 71-105 µmol·$g^{-1}$, and a $Na_2O$ content thereof is ≤0.1 wt. %.

8. The carrier of claim 6, wherein the molar ratio n of silicon to aluminum in the modified Al-SBA-16 is between 10 and 55, a specific surface area is 550-930 $m^2$·$g^{-1}$, an average pore size is 4.0-7.5 nm, and a total pore volume is 0.45-0.70 $cm^3$·$g^{-1}$.

9. The carrier of claim 7, wherein the molar ratio n of silicon to aluminum in the modified Al-SBA-16 is between 10 and 55, a specific surface area is 550-930 $m^2$·$g^{-1}$, an average pore size is 4.0-7.5 nm, and a total pore volume is 0.45-0.70 $cm^3$·$g^{-1}$.

10. The carrier of claim 1, wherein the modified mesoporous molecular sieve Al-SBA-16 is prepared as follows:
   1) weighing SBA-16 and aluminum triethoxide according to an aforesaid weight ratio, and dividing the aluminum triethoxide into two equal portions for use;
   2) adding SBA-16 to n-hexane, and uniformly stirring at room temperature, to obtain a mixed solution; adding one portion of the aluminum triethoxide to n-hexane, and stirring at room temperature until the aluminum triethoxide is dissolved; and adding the aluminum triethoxide dissolved in the n-hexane to the mixed solution, and stirring overnight at room temperature, to obtain a sample solution;
   3) transferring the sample solution obtained in 2) to a Buchner funnel, washing with n-hexane, and suctioning; and repeating the washing and suctioning operations 2 to 4 times, to obtain a primary filter cake;
   4) adding the primary filter cake to n-hexane, and uniformly stiffing at room temperature; adding another portion of the aluminum triethoxide; stirring overnight at room temperature, transferring to a Buchner funnel, washing with n-hexane, and suctioning; and repeating the washing and suctioning operations 2 to 4 times, to obtain a secondary filter cake; and
   5) baking the secondary filter cake at 500-650° C. for 6-10 h, to obtain modified Al-SBA-16.

11. The carrier of claim 1, wherein the mesoporous zirconia has a specific surface area of 190-350 $m^2$·$g^{-1}$, an average pore size of 5.0-8.5 nm, and a total pore volume of 0.40-0.55 $cm^3$·$g^{-1}$.

12. The carrier of claim 1, wherein the silicoaluminophosphate molecular sieve has a total acid content of 0.1-0.35 mmol $NH_3$·$g^{-1}$; a molar ratio of silicon to aluminum of 0-1.0; a specific surface area of ≥150 $m^2$·$g^{-1}$, a $Na_2O$ content of ≤0.2 wt. %, and a total pore volume of 0.10-0.30 $cm^3$·$g^{-1}$.

13. The carrier of claim 12, wherein the silicoaluminophosphate molecular sieve has a molar ratio of silicon to aluminum of 0.21-0.38, a specific surface area of ≥180 $m^2$·$g^{-1}$, a $Na_2O$ content of ≤0.2 wt. %, and a total pore volume of 0.10-0.30 $cm^3$·$g^{-1}$; or the silicoaluminophosphate molecular sieve has a molar ratio of silicon to aluminum of 0-1.0, a specific surface area of ≥150 m$^2$·g$^{-1}$, a Na$_2$O content of ≤0.2 wt. %, and a total pore volume of 0.13-0.26 cm$^3$·g$^{-1}$.

14. A method for preparing a carrier, the method comprising:
1) separately weighing out SBA-16 and aluminum triethoxide according to a weight ratio 1:3.0-4.5, and dividing the aluminum triethoxide into two equal portions;
2) adding the SBA-16 to n-hexane, and uniformly stifling at room temperature, to obtain a mixed solution; adding one portion of the aluminum triethoxide to n-hexane, and stifling at room temperature until the aluminum triethoxide is dissolved; and adding the aluminum triethoxide dissolved in the n-hexane to the mixed solution, and stifling overnight at room temperature, to obtain a sample solution;
3) transferring the sample solution obtained in 2) to a Buchner funnel, washing with n-hexane, and suctioning; and repeating the washing and suctioning operations 2 to 4 times, to obtain a primary filter cake;
4) adding the primary filter cake to n-hexane, and stifling at room temperature; adding another portion of the aluminum triethoxide; stirring overnight at room temperature, transferring to a Buchner funnel, washing with n-hexane, and suctioning; and repeating the washing and suctioning operations 2 to 4 times, to obtain a secondary filter cake;
5) baking the secondary filter cake at 500-650° C. for 6-10 h, to obtain modified Al-SBA-16 for use;
6) uniformly kneading microporous alumina with a dilute nitric acid solution at a weight ratio of 1:0.5-1.5, to prepare a viscous paste for use, in which the concentration of the dilute nitric acid solution is 5-20 wt. %; and
7) weighing, in parts by weight, 5-50 parts of mesoporous zirconia, 10-55 parts of the silicoaluminophosphate molecular sieve, 5-50 parts of modified Al-SBA-16, 1-3 parts of sesbania gum powder and 10-70 parts of the viscous paste based on alumina; and uniformly mixing aforesaid components, rolling, extrusion molding, drying for 6-12 h at 90-120° C., then baking for 4-10 h in air at 500-600° C., and cooling to room temperature to obtain the carrier.

15. The method of claim 14, wherein the carrier is in the shape of a cylindrical strip, a clover or a four-leaf clover; the carrier in the shape of a cylindrical strip has a particle size of 1.2-1.6 mm, and a length of 5-10 mm; and the carrier in the shape of a clover or a four-leaf clover has a distance between two leaves of 1.1-1.8 mm, and a length of 5-10 mm.

16. A catalyst, comprising a soluble cobalt salt and a carrier of claim 1, the soluble cobalt salt being loaded on a surface of the carrier.

17. The catalyst of claim 16, wherein the soluble cobalt salt accounts for 5-20 wt. % of the catalyst.

18. The catalyst of claim 16, wherein the soluble cobalt salt is cobalt nitrate, cobalt acetate or carbonyl cobalt.

19. The catalyst of claim 17, wherein the soluble cobalt salt is cobalt nitrate, cobalt acetate or carbonyl cobalt.

20. A method for preparing the catalyst of claim 16, comprising: impregnating the carrier with an aqueous solution containing the soluble cobalt salt by iso-volume impregnation, aging the carrier overnight at room temperature, then drying for 4-12 h at 90-120° C. under normal pressure, baking for 4-10 h in air at 500-600° C. and cooling to room temperature to obtain the catalyst.

* * * * *